(12) United States Patent
Andersson

(10) Patent No.: US 12,081,074 B2
(45) Date of Patent: Sep. 3, 2024

(54) STATOR COOLING ASSEMBLY FOR ELECTRIC MACHINE

(71) Applicant: Volvo Car Corporation, Gothenburg (SE)

(72) Inventor: Johan Andersson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 267 days.

(21) Appl. No.: 17/343,810

(22) Filed: Jun. 10, 2021

(65) Prior Publication Data
US 2022/0399766 A1     Dec. 15, 2022

(51) Int. Cl.
H02K 1/20       (2006.01)
(52) U.S. Cl.
CPC ..................... *H02K 1/20* (2013.01)
(58) Field of Classification Search
CPC ............. H02K 1/32; H02K 1/20; Y02T 10/64
See application file for complete search history.

(56) References Cited

U.S. PATENT DOCUMENTS

| | | | | | |
|---|---|---|---|---|---|
| 831,625 | A | * | 9/1906 | McElroy | H02K 1/20 310/65 |
| 1,329,247 | A | * | 1/1920 | Kuyser | H02K 9/02 310/63 |
| 1,959,527 | A | * | 5/1934 | Ehrmann | H02K 1/20 310/64 |
| 4,208,597 | A | * | 6/1980 | Mulach | H02K 3/42 174/DIG. 20 |
| 2022/0376566 | A1 | * | 11/2022 | Pal | H02K 5/18 |

* cited by examiner

*Primary Examiner* — Bernard Rojas
(74) *Attorney, Agent, or Firm* — Clements Bernard Walker; Christopher L. Bernard

(57) ABSTRACT

A stator cooling assembly for an electric machine, including: one or more radial cooling fluid channels disposed between a first stator subassembly and a second stator subassembly disposed along a longitudinal axis, wherein the one or more radial cooling fluid channels fluidly couple one or more outer cooling fluid channels with one or more inner cooling fluid channels and deliver a cooling fluid radially between the one or more outer cooling fluid channels and the one or more inner cooling fluid channels; wherein the first stator subassembly and the second stator subassembly include or define the one or more outer cooling fluid channels adapted to contain the cooling fluid and the one or more inner cooling fluid channels adapted to contain the cooling fluid, and wherein the one or more outer cooling fluid channels are disposed circumferentially outwards of the one or more inner cooling fluid channels.

20 Claims, 6 Drawing Sheets

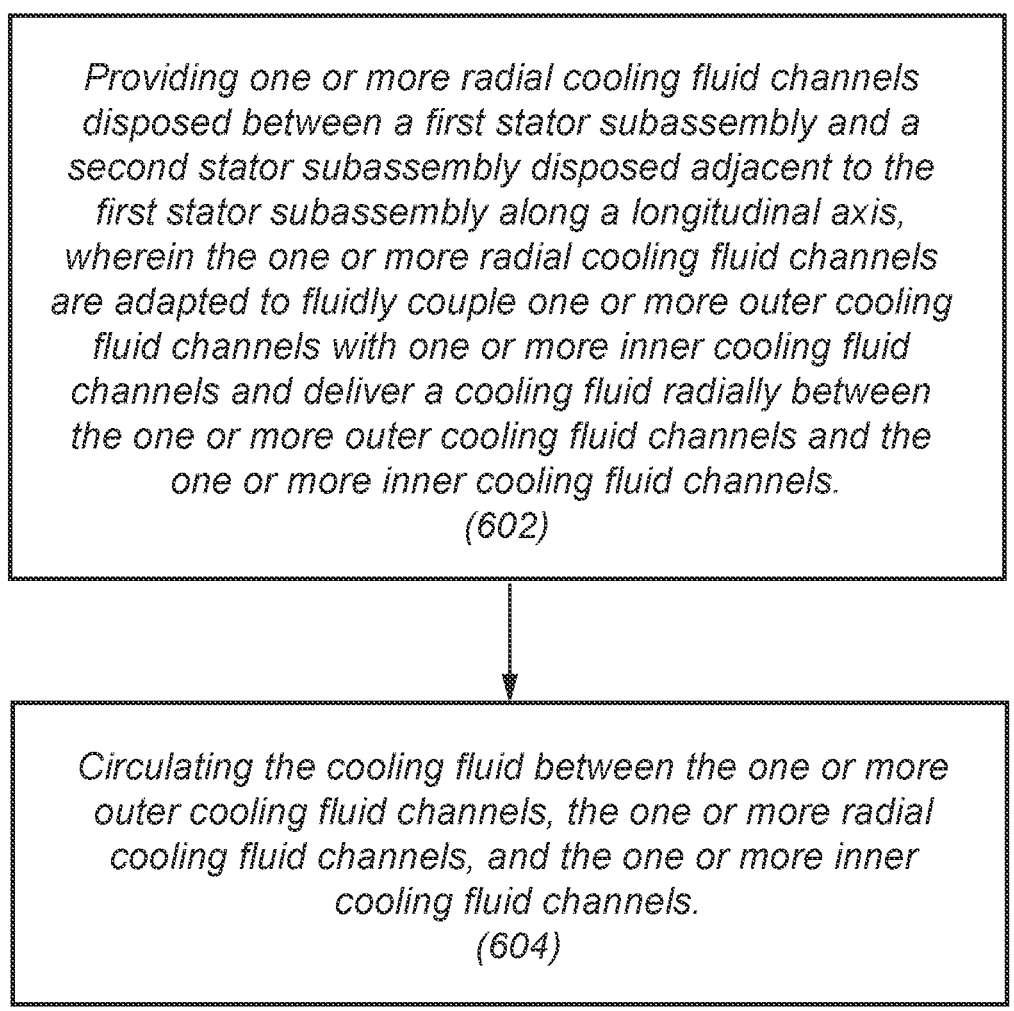

```
                                    600
                                   ↙

┌─────────────────────────────────────────────┐
│  Providing one or more radial cooling fluid channels
│  disposed between a first stator subassembly and a
│  second stator subassembly disposed adjacent to the
│    first stator subassembly along a longitudinal axis,
│  wherein the one or more radial cooling fluid channels
│    are adapted to fluidly couple one or more outer cooling
│      fluid channels with one or more inner cooling fluid
│    channels and deliver a cooling fluid radially between
│     the one or more outer cooling fluid channels and the
│          one or more inner cooling fluid channels.
│                         (602)
└─────────────────────────────────────────────┘
                         │
                         ▼
┌─────────────────────────────────────────────┐
│  Circulating the cooling fluid between the one or more
│   outer cooling fluid channels, the one or more radial
│    cooling fluid channels, and the one or more inner
│                 cooling fluid channels.
│                         (604)
└─────────────────────────────────────────────┘
```

FIG. 6

STATOR COOLING ASSEMBLY FOR ELECTRIC MACHINE

TECHNICAL FIELD

The present disclosure relates generally to the electric machine and automotive fields. More particularly, the present disclosure relates to a stator cooling assembly for an electric machine, such as that used in an electric vehicle or the like.

BACKGROUND

The state of the art in the thermal management of an electric machine, such as an electric motor used in an electric vehicle, is a stator back water jacket. More recently, oil cooled electric machines have become more and more available on the market. Oil cooled electric machines are very efficient with respect to rotor cooling, but stator cooling is more complicated and generally lacking. Specifically, it is difficult to effectively cool the laminate stack and windings of such stators. Thus, what is needed is an improved stator cooling assembly for an oil (or other fluid, liquid or gas) cooled electric machine.

The present background is provided as environmental context only and should not be construed to be limiting in any manner. The concepts of the present disclosure can be implemented in other environmental contexts equally.

SUMMARY

The present disclosure provides an electric machine that utilizes a stator assembly with two (or more) stator subassemblies. One or more outer longitudinal cooling fluid channels are provided that run along or adjacent to the stator laminates, along the outer perimeter of stator sub-assemblies. One or more radial cooling fluid channels are coupled to the one or more outer longitudinal cooling fluid channels and are configured to deliver a cooling fluid (liquid or gas, such as oil, water, or air) to one or more inner longitudinal cooling fluid channels that also run along or adjacent to the stator laminates, along the inner perimeter of the stator subassemblies, near and/or among the stator teeth and windings. The one or more radial cooling fluid channels may be formed by a segmented annular plate disposed between the stator subassemblies. This segmented annular plate defines one or more radially-penetrating notches that fluidly couple the one or more outer longitudinal cooling fluid channels to the one or more inner longitudinal cooling fluid channels, thereby allowing the cooling fluid to penetrate between the stator subassemblies radially from outside to inside. The cooling fluid may drain from the subassembly in any convenient manner, such as from one or more of the opposed ends of the stator subassemblies, and be cooled and recycled to the process, for example.

The concept of the present disclosure effectively reduces the temperature of the windings of the stator assembly, and copper losses are lower if the temperature is lower in the windings, as resistance is lower. Thus, for the electric machine, less current is needed to reach the same torque. The concept of the present disclosure effectively reduces the temperature of the windings by 15-20%, which increases cycle efficiency by roughly 1% as compared to the current state of the art.

In one illustrative embodiment, the present disclosure provides a stator assembly for an electric machine, the stator assembly including: a first stator subassembly; a second stator subassembly disposed adjacent to the first stator subassembly along a longitudinal axis, wherein the first stator subassembly and the second stator subassembly include or define one or more outer cooling fluid channels adapted to contain a cooling fluid, wherein the first stator subassembly and the second stator subassembly further include or define one or more inner cooling fluid channels adapted to contain the cooling fluid, and wherein the one or more outer cooling fluid channels are disposed circumferentially outwards of the one or more inner cooling fluid channels; and one or more radial cooling fluid channels disposed between the first stator subassembly and the second stator subassembly adapted to fluidly couple the one or more outer cooling fluid channels with the one or more inner cooling fluid channels and adapted to deliver the cooling fluid radially between the one or more outer cooling fluid channels and the one or more inner cooling fluid channels. The first stator subassembly includes an annular structure disposed about the longitudinal axis. The second stator subassembly includes an annular structure disposed about the longitudinal axis. The one or more outer cooling fluid channels are formed or defined one or more of adjacent to and within a body or laminate layers of one or more of the first stator subassembly and the second stator subassembly parallel to and radially outwards from the longitudinal axis. The one or more inner cooling fluid channels are formed or defined one or more of adjacent to and within a body or laminate layers of one or more of the first stator subassembly and the second stator subassembly parallel to and radially outwards from the longitudinal axis. The stator assembly further includes a segmented annular plate disposed between the first stator subassembly and the second stator subassembly along the longitudinal axis that defines the one or more radial cooling fluid channels. The segmented annular plate defines a one or more radial notches that traverse a portion of a radial thickness of the first stator subassembly and the second stator subassembly between the one or more outer cooling fluid channels and the one or more inner cooling fluid channels.

In another illustrative embodiment, the present disclosure provides a stator cooling assembly for an electric machine, the stator cooling assembly including: one or more radial cooling fluid channels adapted to be disposed between a first stator subassembly and a second stator subassembly disposed adjacent to the first stator subassembly along a longitudinal axis, wherein the one or more radial cooling fluid channels are adapted to fluidly couple one or more outer cooling fluid channels with one or more inner cooling fluid channels and deliver a cooling fluid radially between the one or more outer cooling fluid channels and the one or more inner cooling fluid channels; wherein the first stator subassembly and the second stator subassembly include or define the one or more outer cooling fluid channels adapted to contain the cooling fluid, wherein the first stator subassembly and the second stator subassembly further include or define the one or more inner cooling fluid channels adapted to contain the cooling fluid, and wherein the one or more outer cooling fluid channels are disposed circumferentially outwards of the one or more inner cooling fluid channels. The first stator subassembly includes an annular structure disposed about the longitudinal axis. The second stator subassembly includes an annular structure disposed about the longitudinal axis. The one or more outer cooling fluid channels are formed or defined one or more of adjacent to and within a body or laminate layers of one or more of the first stator subassembly and the second stator subassembly parallel to and radially outwards from the longitudinal axis.

The one or more inner cooling fluid channels are formed or defined one or more of adjacent to and within a body or laminate layers of one or more of the first stator subassembly and the second stator subassembly parallel to and radially outwards from the longitudinal axis. The stator cooling assembly further includes a segmented annular plate adapted to be disposed between the first stator subassembly and the second stator subassembly along the longitudinal axis that defines the one or more radial cooling fluid channels. The segmented annular plate defines a one or more radial notches that traverse a portion of a radial thickness of the first stator subassembly and the second stator subassembly between the one or more outer cooling fluid channels and the one or more inner cooling fluid channels.

In a further exemplary embodiment, the present disclosure provides a stator cooling method for an electric machine, the stator cooling method including: providing one or more radial cooling fluid channels disposed between a first stator subassembly and a second stator subassembly disposed adjacent to the first stator subassembly along a longitudinal axis, wherein the one or more radial cooling fluid channels are adapted to fluidly couple one or more outer cooling fluid channels with one or more inner cooling fluid channels and deliver a cooling fluid radially between the one or more outer cooling fluid channels and the one or more inner cooling fluid channels; wherein the first stator subassembly and the second stator subassembly include or define the one or more outer cooling fluid channels adapted to contain the cooling fluid, wherein the first stator subassembly and the second stator subassembly further include or define the one or more inner cooling fluid channels adapted to contain the cooling fluid, and wherein the one or more outer cooling fluid channels are disposed circumferentially outwards of the one or more inner cooling fluid channels; and circulating the cooling fluid between the one or more outer cooling fluid channels, the one or more radial cooling fluid channels, and the one or more inner cooling fluid channels. The one or more outer cooling fluid channels are formed or defined one or more of adjacent to and within a body or laminate layers of one or more of the first stator subassembly and the second stator subassembly parallel to and radially outwards from the longitudinal axis. The one or more inner cooling fluid channels are formed or defined one or more of adjacent to and within a body or laminate layers of one or more of the first stator subassembly and the second stator subassembly parallel to and radially outwards from the longitudinal axis. Providing the one or more radial cooling fluid channels includes providing a segmented annular plate disposed between the first stator subassembly and the second stator subassembly along the longitudinal axis that defines the one or more radial cooling fluid channels. The segmented annular plate defines a one or more radial notches that traverse a portion of a radial thickness of the first stator subassembly and the second stator subassembly between the one or more outer cooling fluid channels and the one or more inner cooling fluid channels. Circulating the cooling fluid between the one or more outer cooling fluid channels, the one or more radial cooling fluid channels, and the one or more inner cooling fluid channels cools windings coupled to the first stator subassembly and the second stator subassembly.

BRIEF DESCRIPTION OF THE DRAWINGS

The present disclosure is illustrated and described herein with reference to the various drawings, in which like reference numbers are used to denote like system/assembly components and/or method steps, as appropriate, and in which:

FIG. 6 is a flowchart of one illustrative embodiment of the stator cooling method of the present disclosure.

DETAILED DESCRIPTION

Again, the present disclosure provides an electric machine that utilizes a stator assembly with two (or more) stator subassemblies. One or more outer longitudinal cooling fluid channels are provided that run along or adjacent to the stator laminates, along the outer perimeter of stator sub-assemblies. One or more radial cooling fluid channels are coupled to the one or more outer longitudinal cooling fluid channels and are configured to deliver a cooling fluid (liquid or gas, such as oil, water, or air) to one or more inner longitudinal cooling fluid channels that also run along or adjacent to the stator laminates, along the inner perimeter of the stator subassemblies, near and/or among the stator teeth and windings. The one or more radial cooling fluid channels may be formed by a segmented annular plate disposed between the stator subassemblies. This segmented annular plate defines one or more radially-penetrating notches that fluidly couple the one or more outer longitudinal cooling fluid channels to the one or more inner longitudinal cooling fluid channels, thereby allowing the cooling fluid to penetrate between the stator subassemblies radially from outside to inside. The cooling fluid may drain from the subassembly in any convenient manner, such as from one or more of the opposed ends of the stator subassemblies, and be cooled and recycled to the process, for example.

The concept of the present disclosure effectively reduces the temperature of the windings of the stator assembly, and copper losses are lower if the temperature is lower in the windings, as resistance is lower. Thus, for the electric machine, less current is needed to reach the same torque. The concept of the present disclosure effectively reduces the temperature of the windings by 15-20%, which increases cycle efficiency by roughly 1% as compared to the current state of the art.

Figure 1:
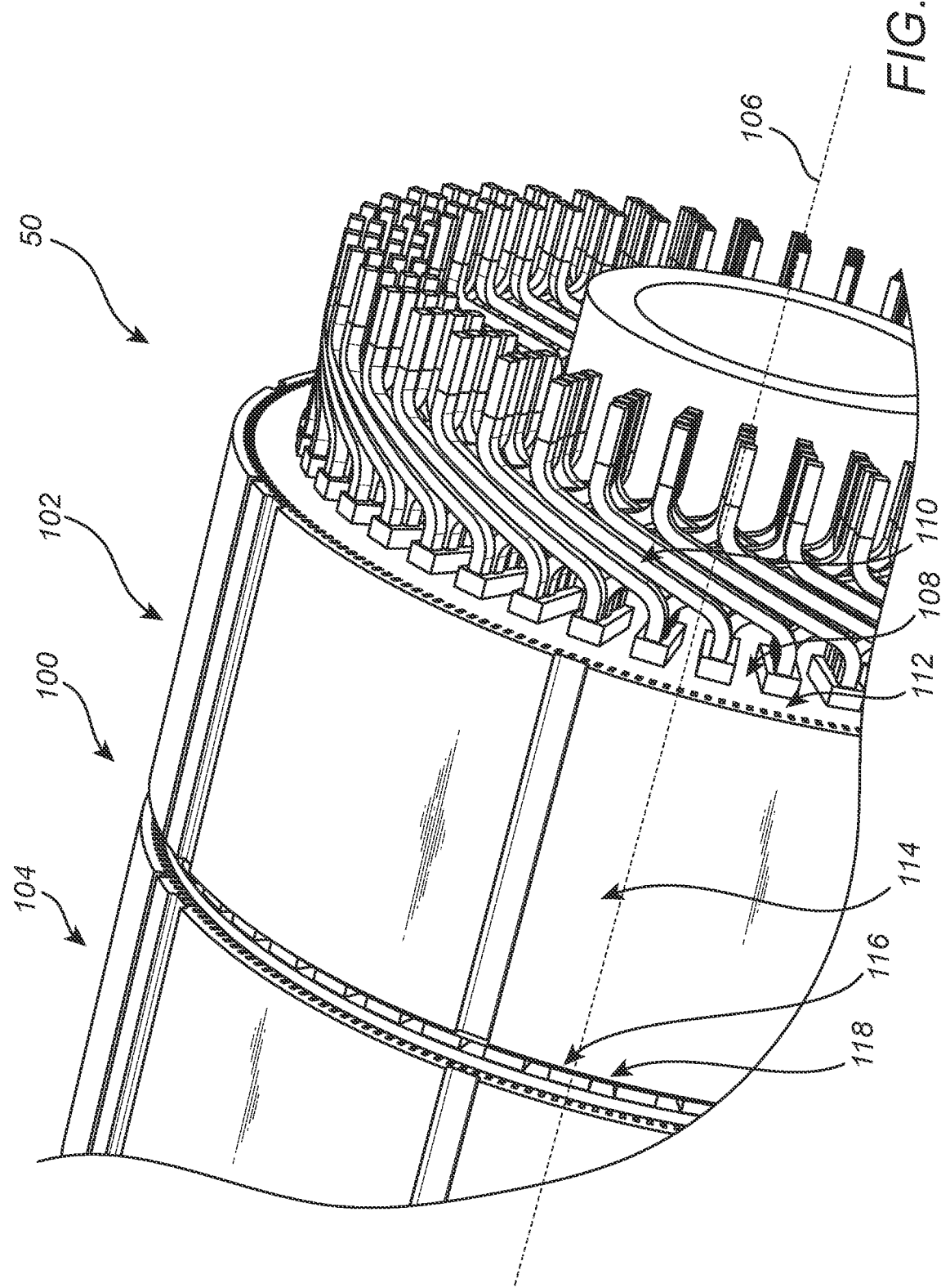
FIG. 1 is a perspective view of one illustrative embodiment of the stator assembly of the present disclosure.

Referring now specifically to FIG. 1, the stator assembly 100 of the present disclosure includes a first stator subassembly 102 and a second stator subassembly 104 that are disposed adjacent to one another along a longitudinal axis 106 of the electric machine 50. The stator assembly 100 and each of the stator subassemblies 102, 104 is a stationary annular structure disposed about the associated rotating rotor and rotor shaft (not illustrated) disposed therein. In general, such electric machines 50 and their components are well known to those of ordinary skill in the art and are not described in greater detail herein. The stator assembly 100 and each of the stator subassemblies 102, 104 include an annular body structure and/or a plurality of laminate layers that comprise the stator assembly 100 and each of the each of the stator subassemblies 102, 104. The first stator subassembly 102 and the second stator subassembly 104 may be separate, adjacent stator components, or they may be partially or wholly integrally formed. In either case, these two subassemblies 102, 104 are separated and defined by various of the intervening cooling channels described in greater detail herein below. It should be noted that, although a first stator subassembly 102 and a second stator subassembly 104 are illustrated and described herein, additional similar stator subassemblies may also be used in a similar manner. The stator assembly 100 and each of the stator subassemblies 102, 104 include a plurality of circumferentially-disposed, radially-aligned internal teeth 108 that are configured to retain a plurality of copper windings 110 or the like utilized by the stator assembly 100. It is these windings 100 that it is advantageous to cool using the assemblies and methods of the present disclosure.

The stator assembly 100 is disposed within a housing (not illustrated) that is optionally flooded with a cooling fluid, thereby surrounding the stator assembly 100 with the cooling fluid. Further, the stator assembly 100 and each of the stator subassemblies 102, 104 may include a plurality of longitudinal (or circumferential) outer cooling fluid channels 112 adapted to also or alternatively contain the cooling fluid. These longitudinal outer cooling fluid channels 112 are formed within the annular body structure or between the plurality of laminate layers and disposed about the outer circumference of each of the stator subassemblies 102, 104, and are ultimately coupled to a cooling fluid circulation system (not illustrated), including appropriate conduits, a pump, a filter, a heat exchanger, etc. As used herein, the "one or more outer cooling fluid channels" include one or more of the plurality of longitudinal (or circumferential) outer cooling fluid channels 112 and/or the general cooling fluid space disposed between the stator assembly 100 and the housing. The outside surface of the stator assembly 100 and each of the stator subassemblies 102, 104 may include one or more longitudinal recesses 114 and/or one or more circumferential recesses 116 that may also be used to conduit the cooling fluid around the outside of the stator assembly 100. Either, both, or any of these may feed the cooling fluid to a plurality of radial cooling fluid channels 118 disposed about the circumference of the stator assembly 100 between the first stator subassembly 102 and the second stator subassembly 104. These radial cooling fluid channels 118 are configured to deliver the cooling fluid into the bulk structure and to the teeth 108 and windings 110 of the stator assembly 100 between the first stator subassembly 102 and the second stator subassembly 104. In the illustrative embodiment provided, the outside openings to these radial cooling fluid channels 118 are disposed about the external surface of the stator assembly 100 within a circumferential recess 116, although this is not required.

Figure 2:
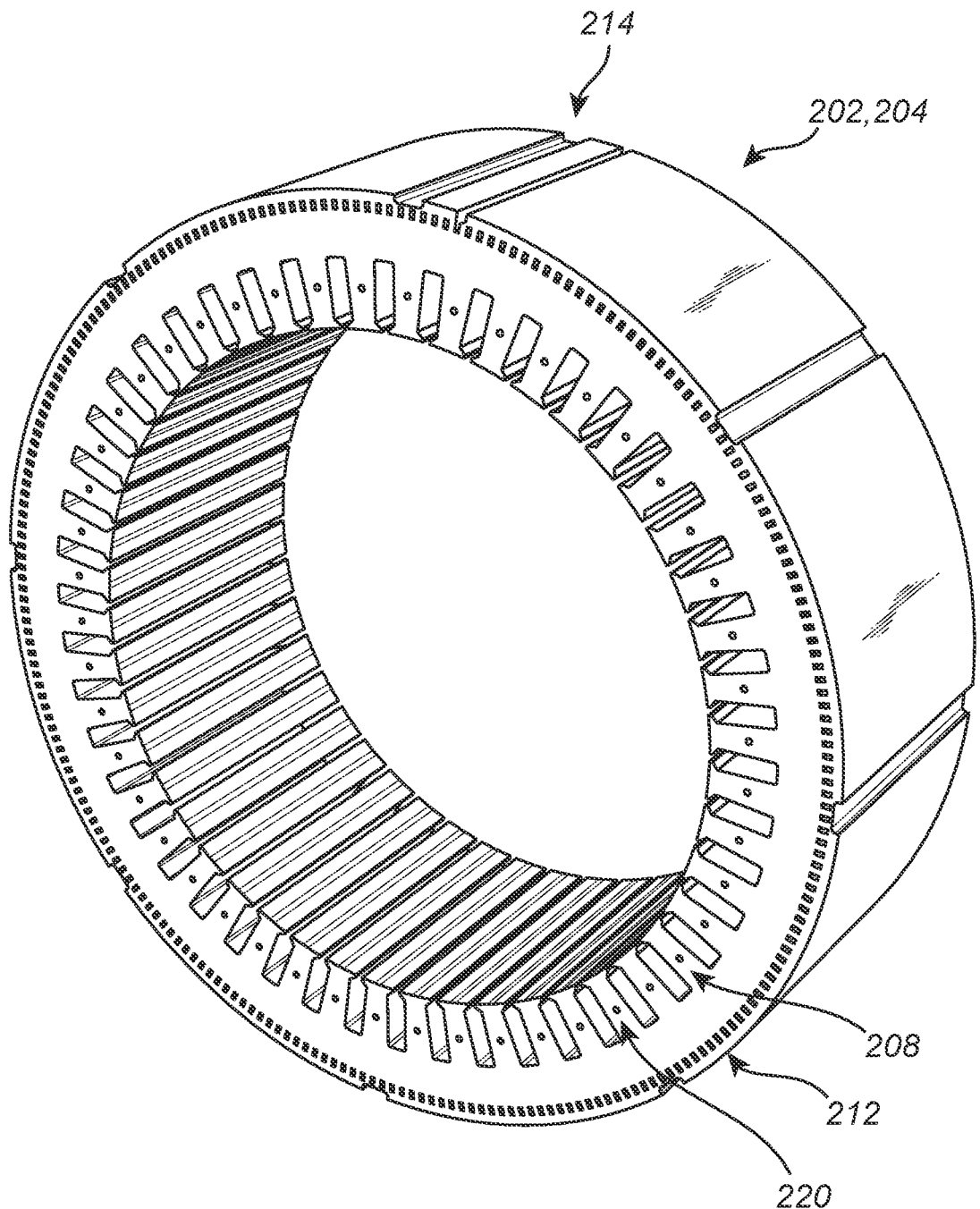
FIG. 2 is a partial perspective view of one illustrative embodiment of one stator subassembly of the stator assembly.

Referring now specifically to FIG. 2, again, each of the stator subassemblies 202, 204 may include a plurality of longitudinal (or circumferential) outer cooling fluid channels 212 adapted to contain the cooling fluid. These longitudinal cooling fluid channels 212 are formed within the annular body structure or between the plurality of laminate layers of the associated stator subassembly 202, 204 and disposed about the outer circumference of the stator subassembly 202, 204, and are ultimately coupled to the cooling fluid circulation system (not illustrated), including the appropriate conduits, a pump, a filter, a heat exchanger, etc. Again, the outside surface of each of the stator subassemblies 202, 204 may include one or more longitudinal recesses 214 and/or one or more circumferential recesses 116 (FIG. 1) that may also be used to conduit the cooling fluid around the outside of the stator subassemblies 202, 204. Either, both, or any of these may feed the cooling fluid to the plurality of radial cooling fluid channels 118 (FIG. 1) disposed about the circumference of the stator assembly 100 (FIG. 1) between the first stator subassembly 202 and the second stator subassembly 204. These radial cooling fluid channels 118 are configured to deliver the cooling fluid into the bulk structure and to the teeth 208 and windings 110 (FIG. 1) of the stator assembly 100 between the first stator subassembly 202 and the second stator subassembly 204. More particularly, the radial cooling fluid channels 118 are configured to deliver the cooling fluid from the outer circumferential regions of the stator subassemblies 202, 204 to a longitudinal inner cooling fluid channel 220 formed through all or selected ones of the teeth 208 adjacent the windings 110 disposed there between. In this manner, the cooling fluid is delivered from the outer circumferential regions of the stator subassemblies 202, 204 to the inner circumferential regions of the stator subassemblies 202, 204, where it may more effectively cool the teeth 208 and copper of the windings 110. It should be noted here that the outside and inside diameters of each of the first stator subassembly 202 and the second stator subassembly 204 have a substantially circular cross-sectional shape, thereby forming an annular structure, with the teeth 208 forming a plurality of internal spaces or notches for receiving the windings 110.

Figure 3:
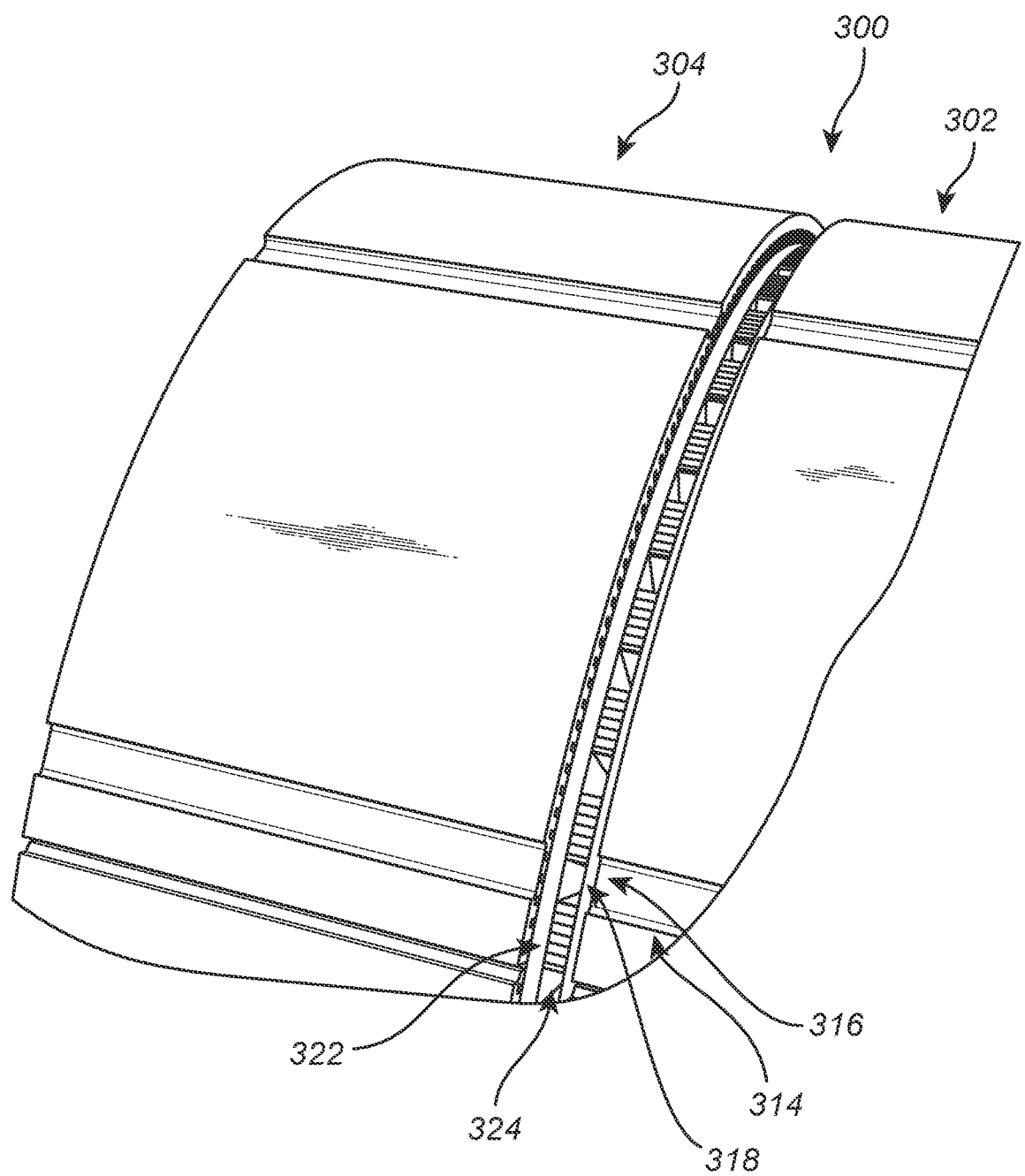
FIG. 3 is a partial perspective view of one illustrative embodiment of the stator assembly of the present disclosure, highlighting the associated segmented annular plate disposed between adjacent stator subassemblies.

Referring now specifically to FIG. 3, again, in a bit more detail, the stator assembly 300 is disposed within a housing (not illustrated) that is optionally flooded with the cooling fluid, thereby surrounding the stator assembly 300 with the cooling fluid. Further, the stator assembly 300 and each of the stator subassemblies 302, 304 may include a plurality of longitudinal (or circumferential) outer cooling fluid channels 112 (FIG. 1) adapted to also or alternatively contain the cooling fluid. These longitudinal outer cooling fluid channels 112 are formed within the annular body structure or between the plurality of laminate layers and disposed about the outer circumference of each of the stator subassemblies 302, 304, and are ultimately coupled to a cooling fluid circulation system (not illustrated), including appropriate conduits, a pump, a filter, a heat exchanger, etc. Again, as used herein, the "one or more outer cooling fluid channels" include one or more of the plurality of longitudinal (or circumferential) outer cooling fluid channels 112 and/or the general cooling fluid space disposed between the stator assembly 300 and the housing. The outside surface of the stator assembly 300 and each of the stator subassemblies 302, 304 may include one or more longitudinal recesses 314 and/or one or more circumferential recesses 316 that may also be used to conduit the cooling fluid around the outside of the stator assembly 300. Either, both, or any of these may feed the cooling fluid to the plurality of radial cooling fluid channels 318 disposed about the circumference of the stator assembly 300 between the first stator subassembly 302 and the second stator subassembly 304. These radial cooling fluid channels 318 are configured to deliver the cooling fluid into the bulk structure and to the teeth 308 and windings 110 (FIG. 1) of the stator assembly 300 between the first stator subassembly 302 and the second stator subassembly 304, and specifically to the longitudinal inner cooling fluid channels 220 (FIG. 2) formed through all or selected ones of the teeth 308 adjacent the windings 110 disposed there between. In the illustrative embodiment provided, the outside openings to these radial cooling fluid channels 318 are disposed about the external surface of the stator assembly 300 within a circumferential recess 316, although this is not required. Here, the outside openings to the radial cooling fluid channels 318 are formed by intermittent wall structures 322 provided by a segmented annular plate 324 that is sandwiched between the first stator subassembly 302 and the second stator subassembly 304 along and about the longitudinal axis 106 (FIG. 1). The radial cooling fluid channels 318 could be formed by other structures as well, or could be formed in the bulk material of the stator assembly 300 itself, provided the same radial cooling fluid penetration into the bulk material and the teeth 308 of the stator assembly 300 is provided.

Figure 4:
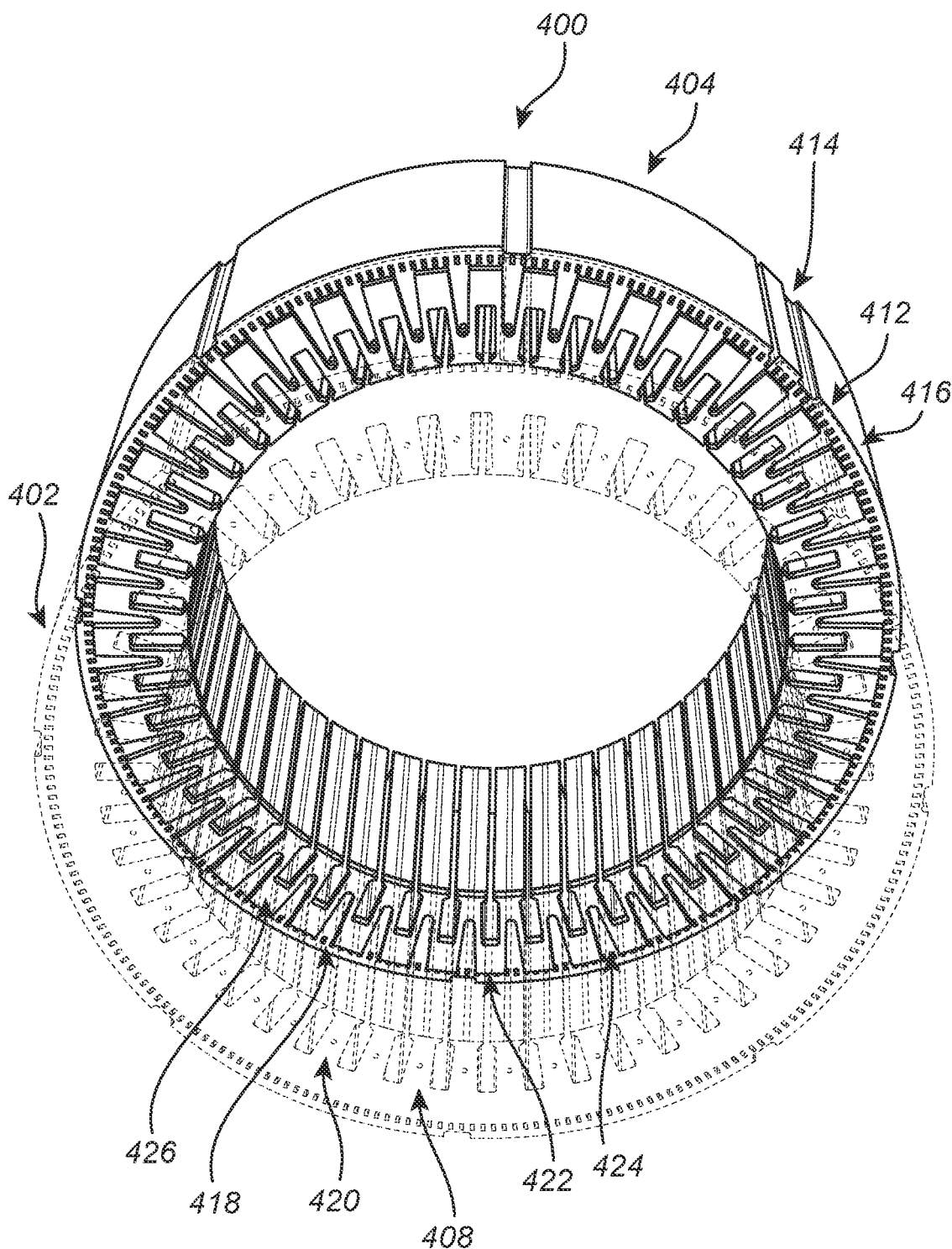
FIG. 4 is a perspective view of one illustrative embodiment of the stator assembly of the present disclosure, again highlighting the associated segmented annular plate disposed between adjacent stator subassemblies.

FIG. 4 illustrates the specific details of this segmented annular plate 424. The segmented annular plate 424 of the stator assembly 400, longitudinally, is fairly thin as compared to the longitudinal dimension of the adjacent first stator subassembly 402 and second stator subassembly 404. The segmented annular plate 424 includes a plurality of radially-aligned and circumferentially-disposed wall structures 422 that define the radially-aligned and circumferentially-disposed cooling fluid channels 418 that fluidly couple the plurality of circumferentially-disposed longitudinal outer cooling fluid channels 412, recesses 414, 416 manufactured into or formed by the external surface(s) of the first stator subassembly 402 and second stator subassembly 404, and/or the region surround the stator assembly 400 to the longitudinal inner cooling fluid channels 420 formed in the teeth 408 of the stator assembly 400, or otherwise conduit the cooling fluid radially into the bulk of the stator assembly 400. Between the radially-aligned and circumferentially-disposed cooling fluid channels 418 disposed about the outside circumference of the segmented annular plate 424, a plurality of spaces or notches 426 are formed about the inside circumference o of the segmented annulate plate 424 to accommodate the windings 110 (FIG. 1) disposed between the teeth 408. Thus, the radially-aligned and circumferentially-disposed wall structures 422 and the radially-aligned and circumferentially-disposed cooling fluid channels 418 are generally aligned with the teeth 408 and the longitudinal inner cooling fluid channels 420 formed in the teeth 408, while the spaces or notches 426 are generally aligned between the teeth 408 and correspond the windings 110.

Figure 5:
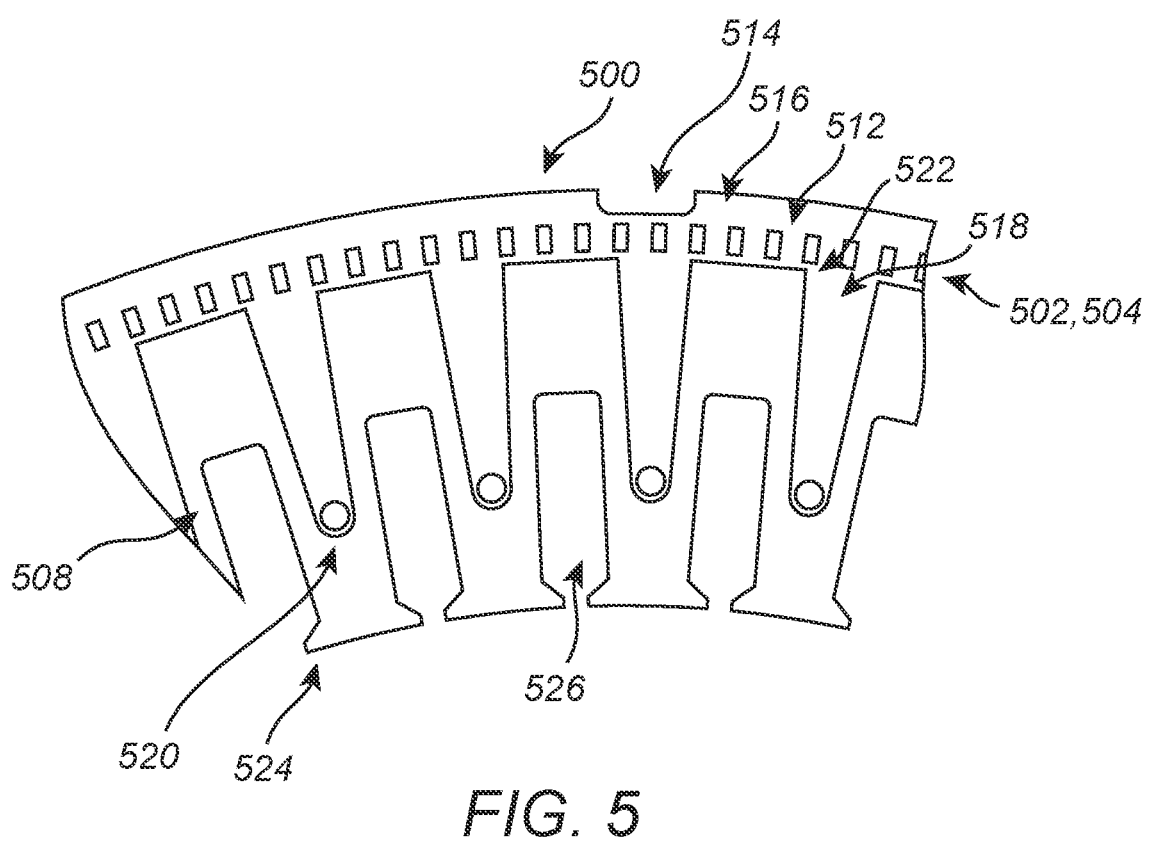
FIG. 5 is a partial planar view of one illustrative embodiment of the segmented annular plate of the stator assembly, highlighting the structure and alignment of the segmented annular plate.

FIG. 5 again illustrates the specific details of this segmented annular plate 524 in a bit more detail. The segmented annular plate 524 of the stator assembly 500, longitudinally, is fairly thin as compared to the longitudinal dimension of the adjacent first stator subassembly 502 and second stator subassembly 504. The segmented annular plate 524 again includes a plurality of radially-aligned and circumferentially-disposed wall structures 522 that define the radially-aligned and circumferentially-disposed cooling fluid channels 518 that fluidly couple the plurality of circumferentially-disposed longitudinal outer cooling fluid channels 512, recesses 514, 516 manufactured into or formed by the external surface(s) of the first stator subassembly 502 and second stator subassembly 504, and/or the region surround the stator assembly 500 to the longitudinal inner cooling fluid channels 520 formed in the teeth 508 of the stator assembly 500, or otherwise conduit the cooling fluid radially into the bulk of the stator assembly 500. Between the radially-aligned and circumferentially-disposed cooling fluid channels 518 disposed about the outside circumference of the segmented annular plate 524, a plurality of spaces or notches 526 are formed about the inside circumference o of the segmented annulate plate 524 to accommodate the windings 110 (FIG. 1) disposed between the teeth 508. Thus, the radially-aligned and circumferentially-disposed wall structures 522 and the radially-aligned and circumferentially-disposed cooling fluid channels 518 are generally aligned with the teeth 508 and the longitudinal inner cooling fluid channels 520 formed in the teeth 508, while the spaces or notches 526 are generally aligned between the teeth 508 and correspond the windings 110. As provided in this illustrative embodiment, the radially-aligned and circumferentially-disposed cooling fluid channels 518 have a generally narrowing taper from outside to inside towards the longitudinal axis 106 (FIG. 1) of the stator assembly 105. The radially-aligned and circumferentially-disposed wall structures 522 also include a widened portion at the bottom of each wall 522 that partially encompasses the corresponding winding 110 disposed in each space or notch 526, although this arrangement is not strictly necessary.

FIG. 6 is a flowchart of one illustrative embodiment of the stator cooling method 600 of the present disclosure. The stator cooling method 600 includes: providing one or more radial cooling fluid channels disposed between a first stator subassembly and a second stator subassembly disposed adjacent to the first stator subassembly along a longitudinal axis (step 602), wherein the one or more radial cooling fluid channels are adapted to fluidly couple one or more outer cooling fluid channels with one or more inner cooling fluid channels and deliver a cooling fluid radially between the one or more outer cooling fluid channels and the one or more inner cooling fluid channels; wherein the first stator subassembly and the second stator subassembly include or define the one or more outer cooling fluid channels adapted to contain the cooling fluid, wherein the first stator subassembly and the second stator subassembly further include or define the one or more inner cooling fluid channels adapted to contain the cooling fluid, and wherein the one or more outer cooling fluid channels are disposed circumferentially outwards of the one or more inner cooling fluid channels; and circulating the cooling fluid between the one or more outer cooling fluid channels, the one or more radial cooling fluid channels, and the one or more inner cooling fluid channels (step 604). The one or more outer cooling fluid channels are formed or defined one or more of adjacent to and within a body or laminate layers of one or more of the first stator subassembly and the second stator subassembly parallel to and radially outwards from the longitudinal axis. The one or more inner cooling fluid channels are formed or defined one or more of adjacent to and within a body or laminate layers of one or more of the first stator subassembly and the second stator subassembly parallel to and radially outwards from the longitudinal axis. Providing the one or more radial cooling fluid channels includes providing a segmented annular plate disposed between the first stator subassembly and the second stator subassembly along the longitudinal axis that defines the one or more radial cooling fluid channels. The segmented annular plate defines a one or more radial notches that traverse a portion of a radial thickness of the first stator subassembly and the second stator subassembly between the one or more outer cooling fluid channels and the one or more inner cooling fluid channels. Circulating the cooling fluid between the one or more outer cooling fluid channels, the one or more radial cooling fluid channels, and the one or more inner cooling fluid channels cools windings coupled to the first stator subassembly and the second stator subassembly.

In general, the electric machine of the present disclosure includes a rotor, bearings, a stator, and windings. The rotor is the moving part of the assembly disposed within the stator that rotates the shaft to deliver mechanical power. The rotor has conductors manufactured into it that carry currents that the magnetic field of the stator exerts force on to turn the shaft. Alternatively, some rotors include permanent magnets, and the stator holds the conductors. There is a gap between the stator and rotor so that the rotor can rotate within the stator. The width of the gap affects the electrical characteristics of the motor. This gap is typically made as small as possible, as a large gap has a strong negative effect on performance. The magnetizing current increases and the power factor decreases with the gap, so narrow gaps are preferred. Very small gaps may pose mechanical tolerance problems in addition to noise and losses.

The rotor is supported by bearings, which allow the rotor to turn on its axis, along the longitudinal axis of the assembly. The bearings are in turn supported by the motor housing. The motor shaft extends through the bearings to the outside of the motor housing, where the load is applied.

The stator provided and cooled herein is the stationary part of the electromagnetic circuit surrounding the rotor, and consists of the field magnets, which are either electromagnets consisting of wire windings around a ferromagnetic iron core or permanent magnets. This creates a magnetic field that passes through the rotor armature, exerting force on the windings. The stator core is made up of many thin metal sheets that are insulated from each other, referred to as the laminations herein. Laminations are used to reduce energy losses that would result if a solid core were used.

The windings are wires that are laid in coils, usually wrapped around a laminated soft iron magnetic core, forming magnetic poles when energized with current. Copper windings are often used.

Again, the present disclosure provides an electric machine that utilizes a stator assembly with two (or more) stator subassemblies. One or more outer longitudinal cooling fluid channels are provided that run along or adjacent to the stator laminates, along the outer perimeter of stator sub-assemblies. One or more radial cooling fluid channels are coupled to the one or more outer longitudinal cooling fluid channels and are configured to deliver a cooling fluid (liquid or gas, such as oil, water, or air) to one or more inner longitudinal cooling fluid channels that also run along or adjacent to the stator laminates, along the inner perimeter of the stator subassemblies, near and/or among the stator teeth and windings. The one or more radial cooling fluid channels may be formed by a segmented annular plate disposed between the stator subassemblies. This segmented annular plate defines one or more radially-penetrating notches that fluidly couple the one or more outer longitudinal cooling fluid channels to the one or more inner longitudinal cooling fluid channels, thereby allowing the cooling fluid to penetrate between the stator subassemblies radially from outside to inside. The cooling fluid may drain from the subassembly in any convenient manner, such as from one or more of the opposed ends of the stator subassemblies, and be cooled and recycled to the process, for example.

The concept of the present disclosure effectively reduces the temperature of the windings of the stator assembly, and copper losses are lower if the temperature is lower in the windings, as resistance is lower. Thus, for the electric machine, less current is needed to reach the same torque. The concept of the present disclosure effectively reduces the temperature of the windings by 15-20%, which increases cycle efficiency by roughly 1% as compared to the current state of the art.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the sprit and scope of the present disclosure, are contemplated thereby, and are intended to be covered by the following non-limiting claims for all purposes.

What is claimed is:

1. A stator assembly for an electric machine, the stator assembly comprising:
  a first stator subassembly;
  a second stator subassembly disposed adjacent to the first stator subassembly along a longitudinal axis, wherein the first stator subassembly and the second stator subassembly comprise or define a circumferential recess around an outside of the stator assembly between the first stator subassembly and the second stator subassembly and one or more outer cooling fluid channels intersecting the circumferential recess and adapted to contain a cooling fluid, wherein the first stator subassembly and the second stator subassembly further comprise or define one or more inner cooling fluid channels adapted to contain the cooling fluid, and wherein the one or more outer cooling fluid channels are disposed circumferentially outwards of the one or more inner cooling fluid channels; and
  one or more radial cooling fluid channels disposed between the first stator subassembly and the second stator subassembly adapted to fluidly couple the circumferential recess and the one or more outer cooling fluid channels with the one or more inner cooling fluid channels and adapted to deliver the cooling fluid radially between the circumferential recess and the one or more outer cooling fluid channels and the one or more inner cooling fluid channels, wherein each of the one or more radial cooling fluid channels has a narrowing taper from outside to inside.

2. The stator assembly of claim 1, wherein the first stator subassembly comprises an annular structure disposed about the longitudinal axis.

3. The stator assembly of claim 1, wherein the second stator subassembly comprises an annular structure disposed about the longitudinal axis.

4. The stator assembly of claim 1, wherein the one or more outer cooling fluid channels are formed or defined one or more of adjacent to and within a body or laminate layers of one or more of the first stator subassembly and the second stator subassembly parallel to and radially outwards from the longitudinal axis.

5. The stator assembly of claim 1, wherein the one or more inner cooling fluid channels are formed or defined one or more of adjacent to and within a body or laminate layers of one or more of the first stator subassembly and the second stator subassembly parallel to and radially outwards from the longitudinal axis.

6. The stator assembly of claim 1, further comprising a segmented annular plate disposed between the first stator subassembly and the second stator subassembly along the longitudinal axis that defines the circumferential recess and the one or more radial cooling fluid channels.

7. The stator assembly of claim 6, wherein the segmented annular plate defines a one or more radial notches that traverse a portion of a radial thickness of the first stator subassembly and the second stator subassembly between the one or more outer cooling fluid channels and the one or more inner cooling fluid channels.

8. A stator cooling assembly for an electric machine, the stator cooling assembly comprising:
one or more radial cooling fluid channels adapted to be disposed between a first stator subassembly and a second stator subassembly disposed adjacent to the first stator subassembly along a longitudinal axis, wherein the one or more radial cooling fluid channels are adapted to fluidly couple a circumferential recess and one or more outer cooling fluid channels with one or more inner cooling fluid channels and deliver a cooling fluid radially between the circumferential recess and the one or more outer cooling fluid channels and the one or more inner cooling fluid channels, wherein each of the one or more radial cooling fluid channels has a narrowing taper from outside to inside;
wherein the first stator subassembly and the second stator subassembly comprise or define the circumferential recess around an outside of the stator cooling assembly between the first stator subassembly and the second stator subassembly and the one or more outer cooling fluid channels intersect the circumferential recess and are adapted to contain the cooling fluid, wherein the first stator subassembly and the second stator subassembly further comprise or define the one or more inner cooling fluid channels adapted to contain the cooling fluid, and wherein the one or more outer cooling fluid channels are disposed circumferentially outwards of the one or more inner cooling fluid channels.

9. The stator cooling assembly of claim 8, wherein the first stator subassembly comprises an annular structure disposed about the longitudinal axis.

10. The stator cooling assembly of claim 8, wherein the second stator subassembly comprises an annular structure disposed about the longitudinal axis.

11. The stator cooling assembly of claim 8, wherein the one or more outer cooling fluid channels are formed or defined one or more of adjacent to and within a body or laminate layers of one or more of the first stator subassembly and the second stator subassembly parallel to and radially outwards from the longitudinal axis.

12. The stator cooling assembly of claim 8, wherein the one or more inner cooling fluid channels are formed or defined one or more of adjacent to and within a body or laminate layers of one or more of the first stator subassembly and the second stator subassembly parallel to and radially outwards from the longitudinal axis.

13. The stator cooling assembly of claim 8, further comprising a segmented annular plate adapted to be disposed between the first stator subassembly and the second stator subassembly along the longitudinal axis that defines the circumferential recess and the one or more radial cooling fluid channels.

14. The stator cooling assembly of claim 13, wherein the segmented annular plate defines a one or more radial notches that traverse a portion of a radial thickness of the first stator subassembly and the second stator subassembly between the one or more outer cooling fluid channels and the one or more inner cooling fluid channels.

15. A stator cooling method for an electric machine, the stator cooling method comprising:
providing one or more radial cooling fluid channels adapted to be disposed between a first stator subassembly and a second stator subassembly disposed adjacent to the first stator subassembly along a longitudinal axis, wherein the one or more radial cooling fluid channels are adapted to fluidly couple a circumferential recess and one or more outer cooling fluid channels with one or more inner cooling fluid channels and deliver a cooling fluid radially between the circumferential recess and the one or more outer cooling fluid channels and the one or more inner cooling fluid channels, wherein each of the one or more radial cooling fluid channels has a narrowing taper from outside to inside;
wherein the first stator subassembly and the second stator subassembly comprise or define the circumferential recess around an outside of the stator cooling assembly between the first stator subassembly and the second stator subassembly and the one or more outer cooling fluid channels intersect the circumferential recess and are adapted to contain the cooling fluid, wherein the first stator subassembly and the second stator subassembly further comprise or define the one or more inner cooling fluid channels adapted to contain the cooling fluid, and wherein the one or more outer cooling fluid channels are disposed circumferentially outwards of the one or more inner cooling fluid channels; and
circulating the cooling fluid between the circumferential recess and the one or more outer cooling fluid channels, the one or more radial cooling fluid channels, and the one or more inner cooling fluid channels.

16. The stator cooling method of claim 15, wherein the one or more outer cooling fluid channels are formed or defined one or more of adjacent to and within a body or laminate layers of one or more of the first stator subassembly and the second stator subassembly parallel to and radially outwards from the longitudinal axis.

17. The stator cooling method of claim 15, wherein the one or more inner cooling fluid channels are formed or defined one or more of adjacent to and within a body or laminate layers of one or more of the first stator subassembly and the second stator subassembly parallel to and radially outwards from the longitudinal axis.

18. The stator cooling method of claim 15, wherein providing the one or more radial cooling fluid channels comprises providing a segmented annular plate disposed between the first stator subassembly and the second stator subassembly along the longitudinal axis that defines the circumferential recess and the one or more radial cooling fluid channels.

19. The stator cooling method of claim 18, wherein the segmented annular plate defines a one or more radial notches that traverse a portion of a radial thickness of the first stator subassembly and the second stator subassembly between the one or more outer cooling fluid channels and the one or more inner cooling fluid channels.

20. The stator cooling method of claim 15, wherein circulating the cooling fluid between the one or more outer cooling fluid channels, the one or more radial cooling fluid channels, and the one or more inner cooling fluid channels cools windings coupled to the first stator subassembly and the second stator subassembly.

* * * * *